(12) United States Patent
Stetsenko et al.

(10) Patent No.: US 10,969,263 B2
(45) Date of Patent: Apr. 6, 2021

(54) FLUID METER

(71) Applicant: ENERGOFLOW AG, Olten (CH)

(72) Inventors: Andrii Stetsenko, Kharkov (UA); Iurii Glova, Kharkov (UA); Sergii Nedzelskyi, Kharkov (UA)

(73) Assignee: ENERGOFLOW AG, Olten (CH)

( * ) Notice: Subject to any disclaimer, the term of this patent is extended or adjusted under 35 U.S.C. 154(b) by 0 days.

(21) Appl. No.: 16/328,292

(22) PCT Filed: Sep. 15, 2017

(86) PCT No.: PCT/EP2017/073239
§ 371 (c)(1),
(2) Date: Feb. 26, 2019

(87) PCT Pub. No.: WO2018/050803
PCT Pub. Date: Mar. 22, 2018

(65) Prior Publication Data
US 2019/0212180 A1    Jul. 11, 2019

(30) Foreign Application Priority Data

Sep. 16, 2016   (EP) .................................... 16189172

(51) Int. Cl.
*G01F 1/06* (2006.01)
*G01F 15/06* (2006.01)
(Continued)

(52) U.S. Cl.
CPC .............. *G01F 15/063* (2013.01); *G01F 1/06* (2013.01); *G01F 1/10* (2013.01); *G01F 1/66* (2013.01);
(Continued)

(58) Field of Classification Search
CPC ... G01F 15/06; G01F 1/06; G01F 1/10; G01F 1/46; G01F 1/56; G01F 15/063;
(Continued)

(56) References Cited

U.S. PATENT DOCUMENTS 7,377,184 B1 * 5/2008 Schlachter ............... G01D 1/18
340/870.01
7,513,150 B2 * 4/2009 Parris ...................... F16K 47/02
73/276

(Continued)

FOREIGN PATENT DOCUMENTS

CH           635930 A5    4/1983
CN      204 043 721 U   12/2014
(Continued)

*Primary Examiner* — Max H Noori
(74) *Attorney, Agent, or Firm* — John Alumit

(57) ABSTRACT

A fluid flow meter with configuration of flow generation and flow sensor is intended for measuring a flow rate of working fluid (a gas or a liquid) passing through an inner cavity. The meter is a compact measuring apparatus of a small size, resistant to disturbances and distortions in the structure of the measured fluid flow. The fluid flow meter with configuration of flow generation and flow sensor is comprised of the following components: a housing (1) having an inner chamber (2) and a depression (3) configured to generate the flow; a flow sensor (4) arranged inside the housing (1) of the gas meter for measuring the flow velocity of the fluid; an adapter (5) to adjust different diameters of flow sensors and an outlet of the meter; a flow preparation device (6) intended for dissipating and stabilizing the flow of the fluid; an inlet (7) of the flow of the measured fluid; an outlet (8) for fluid flow out of the meter; an electronics unit (9); a coarse filter (10); a shut-off valve (11); a fluid leak detection sensor (12).

1 Claim, 2 Drawing Sheets

(51) Int. Cl.
*G01F 1/10* (2006.01)
*G01F 1/66* (2006.01)
*G01F 3/10* (2006.01)
*G01F 15/075* (2006.01)
*G01F 15/12* (2006.01)
*G01F 15/14* (2006.01)
*G01F 15/00* (2006.01)

(52) U.S. Cl.
CPC ............... *G01F 3/10* (2013.01); *G01F 15/00* (2013.01); *G01F 15/075* (2013.01); *G01F 15/125* (2013.01); *G01F 15/14* (2013.01)

(58) Field of Classification Search
CPC ... G01F 1/66; G01F 3/10; G01F 15/00; G01F 15/075; G01F 15/125; G01F 15/14
USPC ....................................................... 73/861.77
See application file for complete search history.

(56) References Cited

U.S. PATENT DOCUMENTS

| 7,748,268 | B2* | 7/2010 | Lull | G01F 15/005 73/204.22 |
| 8,381,597 | B2* | 2/2013 | Carapelli | B67D 7/20 73/861.01 |
| 8,489,342 | B2* | 7/2013 | Dugger | G01F 1/667 702/48 |
| 9,356,334 | B2* | 5/2016 | Winter | G01D 4/006 |
| 2008/0150750 | A1* | 6/2008 | Parris | G01D 11/245 340/870.02 |
| 2012/0031195 | A1* | 2/2012 | Skirda | G01F 3/10 73/861.08 |
| 2014/0361908 | A1* | 12/2014 | Laird | G01F 15/061 340/870.02 |
| 2019/0101411 | A1* | 4/2019 | Davis | G01D 4/004 |
| 2019/0113376 | A1* | 4/2019 | Skallebæk | F16K 27/041 |
| 2019/0234786 | A1* | 8/2019 | Klicpera | G01M 3/26 |

FOREIGN PATENT DOCUMENTS

| DE | 10 2009 006956 A1 | 8/2010 |
| DE | 10 2015 102383 A1 | 8/2016 |
| EP | 1 241 451 A1 | 9/2002 |
| EP | 2 244 078 A2 | 10/2010 |
| EP | 2755 001 A1 | 7/2014 |

* cited by examiner

FLUID METER

1. FIELD OF THE INVENTION

The invention relates to meters intended for measuring a flow rate of working fluid (a gas or a liquid) passing through their inner cavity and having the features described in the claims.

2. STATEMENT OF PROBLEM

There are different principles and technical solutions implementing the measurement of the amount of a fluid passing through a measurement apparatus (measuring instrument).

One of the prior art solutions are the meters exclusively based on the volumetric principles of measurement (patents DE 20 2014 007 095 U1, EP 1 909 076 A1, EP 2 375 224 A1, U.S. Pat. Nos. 4,715,234 A, 8,776,613 B2 и WO 2012 152 560 A1).

Meters operating on the specified volumetric principles are mechanical turbine meters and rotary type meters. The advantage of mechanical meters is their resistance to disturbances and distortions in the flow of the fluid passing through them, as well as resistance to changes in the flow direction. The main drawback of the mechanical method of measurement carried out by said meters is the presence of moving parts making them sensitive to dirt and prone to wear and tear of their parts arranged directly in the flow. Moreover, the diagnostic capabilities of mechanical meters can not be implemented in such volume as that of the electronic ones that does not ensure the required operational control of their metrological and technical characteristics.

As an alternative to mechanical (turbine and rotary) flow meters, ultrasonic meters based on scanning the flow velocity by ultrasonic pulses may be applied. Ultrasonic meters are free from moving and mechanical parts. The disadvantage of ultrasonic meters is their significant sensitivity to flow disturbances. For this reason, in order to achieve higher accuracy, it is required to use flow conditioners or long straight inlet pipelines requiring large measuring space that is not always feasible.

Common disadvantages of the devices operating on volumetric principle also include exposure of fluid flow measurement to the error of approximation arising from pressure and temperature variations that makes it necessary to use additional volume correctors designed to compensate for pressure and temperature and also requires application of appropriate pressure and temperature sensors.

In addition, as noted above, to improve measurement accuracy, said meters require adapters—devices designed to create a uniform flow of gas in order to isolate and protect flow velocity sensors from the turbulence (asymmetry) affecting accuracy of measurement. The application of said adapters creates a significant challenge with domestic gas meters of a small cross section and sensitivity to the pressure drop due to the use of said adapters. Using adapters also causes serious problems in case of their application with industrial meters whose high flow rate requires an increased strength of adapters to withstand stresses and noise caused by the flow to be measured. This limitation takes place mainly due to the high energy of the flow. The known solutions are extremely sensitive to disturbances caused by asymmetrical constrictions that normally occur in valves of pipelines particularly if they are located in the immediate vicinity of the sensor—typically quite close to the meter inlet.

One of the known prior art solutions which eliminates the above disadvantages are meters consisting of a housing with one or a plurality of mass flow sensors (patent EP 2 824 432 A2). The total flow in these meters is substantially divided into a plurality of smaller flows wherein each is measured by a mass flow sensor of corresponding size. This solution has a very complex construction and is costly because of the plurality of flow sensors required for measuring high flow rates and volumes of gas, and thus has limitations for their application as small (domestic) meters. The above solution also has the lowest limit of "internal scalability" of a flow sensor as flow sensors must be designed and manufactured for each individual class of the meter.

The listed disadvantages are eliminated in the inventions given in patents EP 2 146 189 A1, EP 2 824 428 A1, DE 10 2015 102 383 A1. These inventions describe flow meters in which the flow of the fluid to be measured deviates from its main direction of travel, passes through the inner chamber, is reflected from one of the base of the chamber, reverses its direction of movement and passes through an ultrasonic flow converter. Due to this design, the flow of the fluid in the flow meter becomes more uniform, and the flow meter itself is insensitive to disturbances in the flow in the pipeline.

Despite these advantages, such technical solutions have design drawbacks—a reduced cross-sectional area of the flow; distortions in the flow pattern caused by its reflection from the surface of one of the camera bases, increased length of the measuring channels for alignment and flow adjustment; the use of only one (ultrasonic) method of measuring the flow rate; application of the non-separable design of the measuring chamber.

SUMMARY OF THE SOLUTION

The main objective of the present invention is to provide such an apparatus which allows overcoming the above limitations and problems. This is achieved by a fluid flow meter with configuration of flow generation and flow sensor. The given meter is designed in accordance with the features contained in claim 1 of the following claims.

A brief description of the drawings, other features and advantages of the present invention will become apparent from the following detailed description of a preferred embodiment of the present invention.

Although the invention presupposes various modifications and alternative forms, some relevant embodiments described are shown on the drawings and described in detail below. It should be understood, however, that there is no intention to limit the invention to the particular embodiment disclosed but, on the contrary, the objective of the invention is to cover all modifications, equivalents and alternative forms falling within the scope of the invention as defined in the claims. Using "e.g.", "etc.", "or" refers to the non-exclusive alternatives without limitations, unless otherwise indicated. The use of "comprising" means "including, but not limited to", unless otherwise specified.

The invention is a fluid meter comprising a housing with an inner chamber, which is made in the form of a cylinder with a uniform rounding of one of the bases. The rounded base has a curved inward part and allows the formation of a fluid flow.

Besides, the meter contains a flow sensor arranged inside the housing and used for measuring flow velocity of the fluid.

The fluid meter has an adapter for adjusting different diameters of flow sensors and an outlet of the meter.

In addition, the fluid meter contains a flow preparation device for dissipating and stabilizing the flow of the measured fluid.

The fluid meter has an inlet for directing the fluid flow into the chamber of the meter housing, an outlet for outputting the fluid flow from the meter, an electronics unit, a coarse filter, a shut-off valve and a fluid leak detection sensor.

The inner chamber at the inlet of the flow sensor has the bell-like funnel shape, which forms a flow at the inlet of the flow sensor.

The adapter is adjustable and the transition mechanism adapts to the diameter of the flow sensor used.

Other preferred embodiments are disclosed in the claims.

The advantage of the first claim of the invention is the configuration of the meter with the features contained in claim 2, when the flow sensor is located in the center of the chamber along its cylindrical axis. In this case, the inner surface of the chamber and the outer surface of the flow sensor form a channel, when passing through which the measured fluid forms a steady homogeneous laminar flow.

The advantage of claim 2 is the configuration of the meter with the features contained in claim 3, when the transition device is used for adjusting the flow sensor diameter and the meter outlet, and which is located in close proximity to the outlet, which results in a compact form of the meter.

The advantage of claim 3 is the configuration of the device with the features contained in claim 4, when the inner chamber has a flow preparation device in the shape of a grid at its bottom. This device divides the inward fluid flow into multiple separate streams passing through the chamber. Thus, a stable homogeneous flow is being formed.

Claim 4 of the preferred embodiment with the features contained in claim 5 shows a fluid leak detection sensor which ensures the safety of the device by detecting the fluid leakage from the meter, actuation of the shut-off valve and stopping the working fluid supply to the meter.

Claim 5 of the preferred embodiment with the features contained in claim 6 describes the meter housing, whose cross-sectional area is many times (not less than 10 times) larger than the cross-sectional area of the inlet channel of the meter and the inlet of the flow sensor, which significantly reduces the influence of the external disturbing factors and provides high-precision measurements.

The advantage of claim 6 of the preferred embodiment with the features contained in claim 7 is the configuration of the meter which allows to use a flow sensor of any operating principle, thus ensuring the versatility of the meter.

The invention is described below in more detail, using as an example an embodiment with a reference to the accompanying drawings.

DETAILED DESCRIPTION OF THE INVENTION

Figure 2:
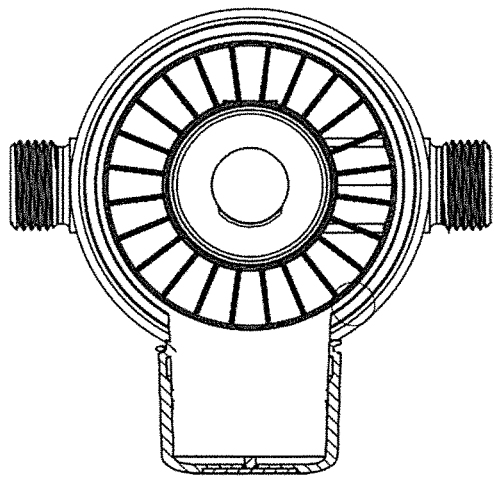
Figure 3:
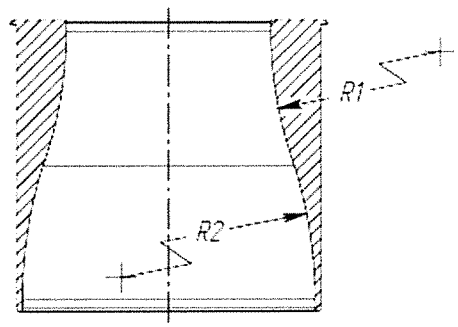
Figure 4:
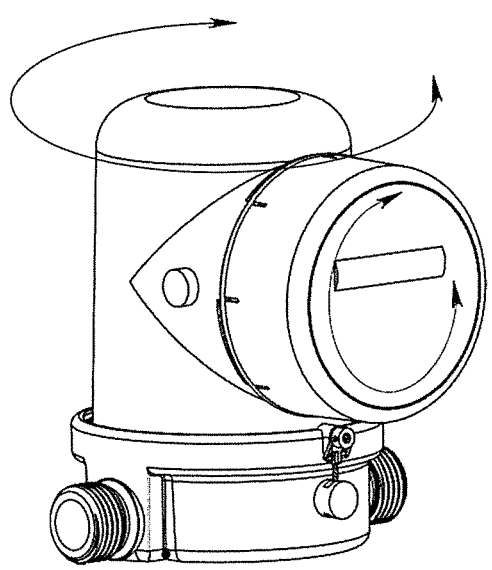

FIGS. 1-4 illustrate:
schematic three-dimensional view of the meter featuring its electronics unit, leak detection sensor, inlets and outlets (FIG. 1*a*), and the direction of fluid flow in the meter;
schematic sectional view of the meter performed in accordance with the present invention (FIG. 1*b*);
schematic view (top view) of a flow preparation device designed to dissipate and stabilize the flow of the fluid (grid, divider) (FIG. 2),
schematic sectional view of the adapter (FIG. 3);
schematic view of the direction of rotation of the meter's moving parts (housing, electronics unit) (FIG. 4).

Figure 1A:
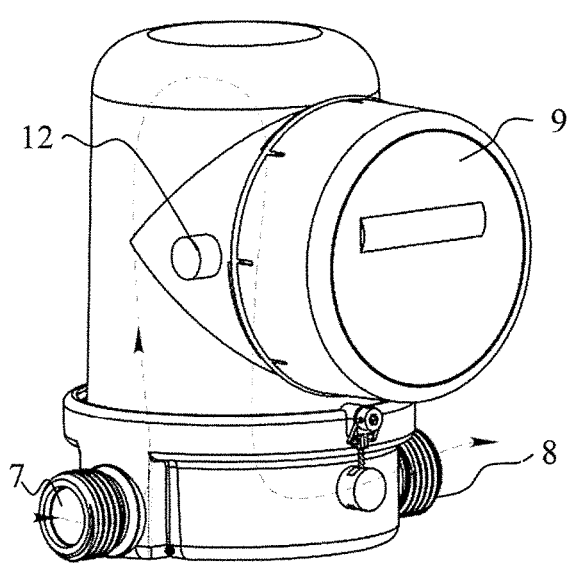
FIGS. 1-4 illustrate the invention which overcomes disadvantages of the prior art inventions—a compact fluid flow meter with configuration of flow generating and flow sensor.
Figure 1B:
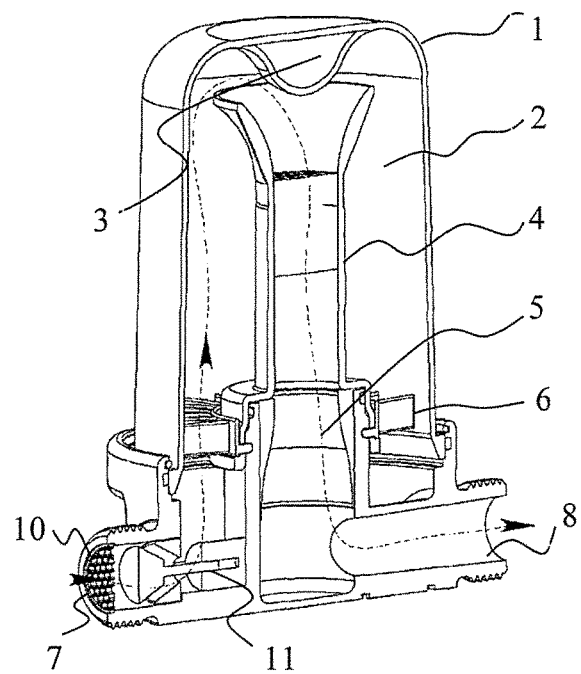

| FIG. 1a-1b | |
| --- | --- |
| 1 | housing |
| 2 | inner chamber |
| 3 | depression |
| 4 | flow sensor |
| 5 | adapter |
| 6 | flow preparation device |
| 7 | main inlet |
| 8 | outlet |
| 9 | electronics unit |
| 10 | coarse filter |
| 11 | shut-off valve |
| 12 | fluid leak detection sensor |

DESCRIPTION OF THE INVENTION

A fluid flow meter with configuration of flow generation and flow sensor for measuring flow velocity and flow rate of a fluid is a device comprising the following components (FIGS. 1*a*-1*b*):
a cylindrical housing (1) having an inner chamber (2) and a depression (3) configured for flow generation;
a flow sensor (4) with a funnel-shaped inlet located inside the central part of the housing (1) of the gas meter and designed for measuring the flow velocity of the fluid;
an adapter (5) for adjusting various diameters of flow sensors and the meter outlet;
a flow preparation device (6) designed to dissipate and stabilize the flow of the fluid;
an inlet (7) of the measured fluid flow;
an outlet (8) for fluid flow out of the meter;
an electronics unit (9);
a coarse filter (10);
a shut-off valve (11);
a fluid leak detection sensor (12).

FIG. 1 illustrates, as an example of the invention, a stationary meter with configuration of flow generation and flow sensor for measuring the flow velocity and the flow rate of the working fluid. The invention relates to flow meters intended for measuring the fluid flow with measurement based on volumetric principles. The invention relates to meters for not only domestic application (e.g., G4/G6 nominal sizes), but also for measuring high flow rates, i.e., for industrial meters of G10, G16, G25, G40 nominal sizes etc. (where, for example, nominal size G25 denotes a flow rate up to 48 m$^3$/h). Besides, the invention relates to meters with a remote control of their functionality which include electronic remote control systems requiring the application of pressure and temperature sensors, as well as additional volume correctors to compensate for the errors of approximation arising from temperature and pressure fluctuations.

The operating principle of the meter is as follows:
fluid to be measured enters the inlet (7), passes through the coarse filter (10), the flow preparation device (6) and is dissipated into a plurality of flows;
these flows are distributed throughout the cavity of the chamber (2), then pass along its central axis from one base to another within the space formed by the inner surface of the housing walls (1) and the outer surface of the flow sensor (4), flow around the inner depression (3) repeating its shape and are formed at the inlet of the flow sensor (4) as a stable uniform flow providing the most favorable conditions for highly accurate measurement of its velocity;

the flow converges to the funnel-shaped inlet of the flow sensor (4), increases the flow velocity and, thereby, reduces the flow sensor (4) susceptibility to disturbances and distortions of the flow at the inlet of the meter;

the flow further passes through the inner cavity of the flow sensor (4) and flows out of the meter through the outlet (8);

the flow sensor (4) forms a signal proportional to the flow rate during the fluid flow passing through its inner cavity;

the electronics unit (9) of the meter receives this signal, processes and forms a signal proportional to the volumetric flow of the working fluid.

The direction of the fluid flow movement in the meter is shown in FIGS. 1a and 1b. FIG. 2 illustrates a schematic view (top view) of a flow preparation device. The flow preparation device (6) is a grid arranged at the bottom of the cylindrical part of the chamber (2) such that the fluid to be measured through the inlet (7) passes through the flow preparation device (6) and falls into the chamber (2) of the meter housing (1). The grid of the flow preparation device is a set of at least 21 blades with such dimensions to not overlap more than 23% of the total cross sectional area of the chamber (2). The flow preparation device (6) performs flow dissipation of the fluid to be measured providing conditions for creating a uniform and steady flow, and thus substantially reduces the effects caused by the high energy of the turbulent flow at the inlet of the flow sensor (4). The meters based on volumetric principles are prone to errors caused by the gas flow distortion in the pipeline due to various destabilizing factors known as local resistance (faucets, valves, switches, pipe bends, constrictions and expansions of the pipeline, the diameter changes, temperature and pressure gauges taps etc.). Application of the flow preparation device (6) together with the described chamber configuration (2) provides stabilization of the flow, leveling its velocity profile, and thus eliminates the necessity to use any external devices to create the undisturbed gas flow (adapters) at any, even inconsiderable, flow distortion and disturbance of the fluid to be measured at the meter inlet.

The flow sensor (4) is a measuring element (a sensor, a flow tube) of volume flow or flow velocity of any operating principle. The sensor is located in a cylindrical chamber (2) of the meter housing (1) so that the fluid to be measured passes from the inlet (7) through the flow preparation device (6), is further dissipated into a plurality of flows, passes through the chamber (2), flows around the depression (3), combines in the center of the chamber (2) into a uniform stable flow which passes through the flow sensor (4) and exits the meter through the outlet (8). Any known measuring devices of volume flow and flow velocity of volumetric or mass operating principle (turbine, rotary, ultrasonic anemometer etc.) with dimensions corresponding to the dimensions of the inner chamber (2) of the meter housing (1) may be used as the flow sensor (4). Therefore there is no need to further describe this flow sensor (4). In any case, the flow sensor (4) detects the data directly or indirectly indicating the amount of fluid flowing through the pipe and through the meter. These data are transmitted by the flow sensor (4) to the electronics unit (9) of the meter for further processing and recording (storing).

The distinguishing feature of the meter is the presence of the adapter (5) arranged in the inner lower part of the housing (after the flow sensor outlet) intended for adjusting the diameter of the flow sensor (4) and the meter outlet. The adapter allows to arrange in the meter flow sensors of different diameters depending on the desired range of measured flow. A schematic sectional view of the adapter is shown in FIG. 3.

The inlet (7) of the fluid flow is an orifice, a channel directing the fluid flow into the chamber (2) of the meter housing (1).

The output channel (8) is intended to output the fluid flow exiting the chamber (2) of the meter housing (1).

The electronics unit (9) is intended to detect the data transmitted from the flow sensor (4), processing, recording (storing) of these data and their processing results and electronic control. The type of the electronics unit (9) may vary depending on the implementation requirements and causes no significant influence on the present invention. The electronics unit (9) is connected to the flow sensor (4) by means of a physical data link (the term "physical data link" is herein referred to a line of one or several solid connectors (such as plugs, wires) or a wireless communication line (radio, Bluetooth etc.). FIG. 1a shows an embodiment in which the electronics unit (9) is arranged on the outer side of the meter housing (1).

The coarse filter (10) is arranged at the meter inlet and is intended to purify the fluid of impurities that can clog or damage the flow sensor (4) or the flow preparation device (6).

The shut-off valve (11) is arranged at the inlet (7) and provides the overlap (cut-off) of the fluid flow on a signal received from the electronics unit (9).

The fluid leak detection sensor (12) is intended to provide detection of the fluid leakage from the meter, actuation of the shut-off valve (11) and stopping the working fluid supply to the meter. This sensor is essential for operating safety of combustible media meters the leakage of which can lead to an accident and serious consequences.

The housing (1) consists of two parts (FIG. 4):
A fixed part (base), which contains the inlet (7), the outlet (8), the flow preparation device (6), the coarse filter (10), the shut-off valve (11), the adapter (5), the flow sensor (4);
the moving part is of cylindrical form (dome) with a rounding in one of the bases which can be rotated about its central axis. The electronics unit (9) whose front part can also be rotated about its central axis can be fixed on the outer moving part of the housing (1).

FIG. 4 shows with arrows the direction of rotation of the moving parts of the housing and the electronics unit.

The invention has the following advantages:
the presence of a fairing (3) in the central part of one of the bases of the inner chamber (2) of the counter, due to a certain geometrical shape (bell shape), reduces and forms a flow in the central part of the chamber (2) at the inlet of the flow sensor (4); as well as an increase in the speed of its movement;
the presence of a transfer device (5) allows to use as a flow sensor (4) a volumetric flow meter or a flow rate of any principle of operation from any manufacturer with different connecting dimensions;

the use of flow sensors (4) that implement various measuring principles (methods) allows the selection of such sensor sizes to provide a larger cross-sectional area of the inner chamber (2)

a large cross-sectional area of the inner chamber (2) provides insignificant losses of medium pressure in the counter;

since the inner chamber (2) of the counter has a cross-sectional area that is many times (not less than 10 times) larger than the cross-sectional area of the inlet channel (7) of the counter and the inlet of the flow sensor (4), the flow of the medium to be measured, hole in the chamber, significantly reduces the speed of movement, becomes more uniform and stable. Further, by flowing through the flow sensor (whose diameter is several times smaller than the diameter of the chamber), the flow increases the speed of movement, which creates more favorable conditions for high-precision measurements of the flow velocity and additionally reduces the influence of external disturbing factors;

The application of these technical solutions significantly expands the list of flow sensors that can be used in the meter, provides higher stability and uniformity of flow in the measuring section, and, in practice, a complete insensitivity of the counter to the disturbances in the flow in the pipe caused by local resistance like "reducer", "Gate valve", etc. These solutions serve as a decoupling of the flow conditions before the flow sensor from the flow conditions at the counter input. As a result, the accuracy of measuring the flow rate of the medium by the meter is increased, resistance to disturbances is provided, the possibility of using short straight sections of the measuring pipeline is provided.

The invention claimed is:

1. A fluid flow meter comprising:
a cylindrical housing (1) having an inner chamber (2), which is designed in the form of a cylinder with a uniform rounding of a base of said inner chamber; said rounded base has an inwardly curved part and allows formation and deflection of a fluid flow;

a flow sensor (4), which is located inside the center of inner chamber (2) along its axis, for measuring the flow rate of a fluid;

an adapter (5) to adjust different diameters of the flow sensor (4) and a meter outlet opening (8) disposed at the rounded base, said adapter is arranged inside the center of the base of the inner chamber opposite to the rounded base with the inwardly curved part;

a flow preparation device (6) that separates and stabilizes the fluid flow, said flow preparation device; said flow preparation device is arranged at the base of the inner chamber (2) opposite the rounded base with the inwardly curved part;

an inlet channel (7) for the fluid flow flowing into the meter and passing through a a coarse filter (10), said inlet channel disposed at the rounded base;

an outlet channel (8) for the fluid flow flowing out of the meter, said outlet channel disposed at the rounded base; and a fluid leak detection sensor (12) disposed on the cylindrical housing that is electrically connected with an electronic unit (9) and/or shut-off valve (11);

characterized in that an inlet of the flow sensor (4) has a funnel-shaped form that forms a flow at the inlet of the flow sensor and connects with an inwardly curved part in form of a bell, that the flow sensor (4) and the adapter (5) are adjustable and that the adapter (5) can be adapted to the diameter of the flow sensor (4) used.

* * * * *